(12) United States Patent
Wu et al.

(10) Patent No.: US 12,082,262 B2
(45) Date of Patent: Sep. 3, 2024

(54) MECHANISM FOR PROVIDING MULTIPLE TRANSMISSION OPPORTUNITIES

(71) Applicant: Nokia Technologies Oy, Espoo (FI)

(72) Inventors: Chunli Wu, Beijing (CN); Benoist Sebire, Tokyo (JP); Samuli Turtinen, Ii (FI)

(73) Assignee: Nokia Technologies Oy, Espoo (FI)

(*) Notice: Subject to any disclaimer, the term of this patent is extended or adjusted under 35 U.S.C. 154(b) by 401 days.

(21) Appl. No.: 17/606,815

(22) PCT Filed: Apr. 30, 2019

(86) PCT No.: PCT/CN2019/085346
§ 371 (c)(1),
(2) Date: Oct. 27, 2021

(87) PCT Pub. No.: WO2020/220332
PCT Pub. Date: Nov. 5, 2020

(65) Prior Publication Data
US 2022/0256609 A1  Aug. 11, 2022

(51) Int. Cl.
*H04W 74/0833* (2024.01)

(52) U.S. Cl.
CPC .............. *H04W 74/0833* (2013.01)

(58) Field of Classification Search
CPC ................................................. H04W 74/0833
See application file for complete search history.

(56) References Cited

U.S. PATENT DOCUMENTS

| 2016/0345352 | A1* | 11/2016 | Langereis | H04B 1/40 |
| 2017/0331577 | A1* | 11/2017 | Parkvall | H04L 5/1469 |
| 2018/0146498 | A1* | 5/2018 | Sahlin | H04W 56/0005 |
| 2018/0184461 | A1* | 6/2018 | Zhang | H04W 72/044 |
| 2018/0199381 | A1* | 7/2018 | Rong | H04W 74/0833 |
| 2018/0317263 | A1* | 11/2018 | Ishii | H04W 74/0833 |
| 2019/0254078 | A1* | 8/2019 | Zhang | H04W 72/0453 |
| 2019/0305899 | A1* | 10/2019 | Rico Alvarino | H04W 24/10 |
| 2020/0068616 | A1* | 2/2020 | Qian | H04W 74/002 |
| 2021/0212111 | A1* | 7/2021 | Cho | H04W 72/12 |
| 2021/0212122 | A1* | 7/2021 | Cho | H04W 72/12 |
| 2022/0167425 | A1* | 5/2022 | Lei | H04L 27/0008 |

FOREIGN PATENT DOCUMENTS

| CN | 104186010 A | 12/2014 |
| CN | 106937404 A | 7/2017 |
| CN | 108476480 A | 8/2018 |

OTHER PUBLICATIONS

3GPP TSG RAN WG1 Meeting 94, Gothenburg, Sweden, Aug. 20-24, 2018, R1-1809300, Lenovo, Motorola Mobility, "Extensions for Channel Access Procedures", 3 pgs.
"4-step RACH procedure for NR-U", LG Electronics Inc., 3GPP TSG-RAN WG2 #105, R2-1901754, Mar. 2019, 3 pages.

* cited by examiner

*Primary Examiner* — Ajit Patel
(74) *Attorney, Agent, or Firm* — Harrington & Smith

(57) ABSTRACT

Embodiments of the present disclosure relate to mechanism for providing multiple transmission opportunities. According to embodiments of the present disclosure, the network device transmits the random access response which includes an indication as to the number of transmission opportunities. If the random access response includes the preamble of the terminal device, the indication as to the number of transmission opportunities is applied to the terminal device. In this way, overheads are saved and the flexibility is improved.

22 Claims, 7 Drawing Sheets

MECHANISM FOR PROVIDING MULTIPLE TRANSMISSION OPPORTUNITIES

CROSS REFERENCE TO RELATED APPLICATION

This patent application is a U.S. National Stage application of International Patent Application Number PCT/CN2019/085346 filed Apr. 30, 2019, which is hereby incorporated by reference in its entirety.

FIELD

Embodiments of the present disclosure generally relate to the field of communications and in particular, to a method, device, apparatus and computer readable storage medium for providing multiple transmission opportunities.

BACKGROUND

In recent communication networks, communications on unlicensed spectrum have been proposed to improve communication capacity. For example, a random access channel (RACH) is shared by terminal devices to request access to networks for call set-up and burst data transmission. Since the RACH is shared, it is possible that two or more terminal devices transmit at the same time and their transmissions collide. This is known as contention. If the terminal device does not get response, it performs the random access request again. Such transmission collisions may incur undesirable failure of random access and unexpected delay in transmission.

SUMMARY

Generally, embodiments of the present disclosure relate to a method for providing multiple transmission opportunities and the corresponding communication devices.

In a first aspect, there is provided a device. The device comprises at least one processor; and at least one memory including computer program codes; the at least one memory and the computer program codes are configured to, with the at least one processor, cause the device to transmit a random access request from the device to a further device. The random access request comprises a preamble of the device. The device is also caused to receive a random access response to the random access request from the further device. The random access response comprises an indication as to the number of transmission opportunities granted for a set of devices of which random access requests are responded. The device is further caused to determine the number of transmission opportunities granted for the device based on the indication in response to determining that the random access response comprises the preamble of the device. The device is yet caused to determine a set of transmission resources for the device based at least in part on the number of the transmission opportunities.

In a second aspect, there is provided a device. The device comprises at least one processor; and at least one memory including computer program codes; the at least one memory and the computer program codes are configured to, with the at least one processor, cause the device to receive, from a further device, a random access request comprising a preamble of the further device. The device is also caused to generate a random access response to the random access request in response to the random access request being accepted. The random access response comprises the preamble of the further device. The device is further caused to transmit the random access response to the further device. The random access response comprises an indication as to the number of transmission opportunities granted for a set of devices of which random access requests are responded and a transmission resource for one transmission opportunity.

In a third aspect, there is provided a method. The method comprises transmitting a random access request from a first device to a second device. The random access request comprises a preamble of the first device. The method also comprises receiving a random access response to the random access request from the second device. The random access response comprises an indication as to the number of transmission opportunities granted for a set of devices of which random access requests are responded. The method further comprises in response to determining that the random access response comprises the preamble of the first device, determining the number of transmission opportunities granted for the first device based on the indication. The method yet comprises determining a set of transmission resources for the first device based at least in part on the number of the transmission opportunities.

In a fourth aspect, there is provided a method. The method comprises receiving, from a first device and at a second device, a random access request comprising a preamble of the first device. The method also comprises in response to the random access request being accepted, generating a random access response to the random access request. The random access response comprises the preamble of the first device. The method further comprises transmitting the random access response to the first device. The random access response comprises an indication as to the number of transmission opportunities granted for a set of devices of which random access requests are responded and a transmission resource for one transmission opportunity.

In a fifth aspect, there is provided an apparatus. The apparatus comprises means for transmitting a random access request from a first device to a second device. The random access request comprises a preamble of the first device. The apparatus also comprises means for receiving a random access response to the random access request from the second device. The random access response comprises an indication as to the number of transmission opportunities granted for a set of devices of which random access requests are responded. The apparatus further comprises means for in response to determining that the random access response comprises the preamble of the first device, determining the number of transmission opportunities granted for the first device based on the random access response. The apparatus yet comprises means for determining a set of transmission resources for the first device based at least in part on the number of the transmission opportunities.

In a sixth aspect, there is provided an apparatus. The apparatus comprises means for receiving, from a first device and at a second device, a random access request comprising a preamble of the first device. The apparatus also comprises means for in response to the random access request being accepted, generating a random access response to the random access request. The random access response comprises the preamble of the first device. The apparatus further comprises means for transmitting the random access response to the first device. The random access response comprises an indication as to the number of transmission opportunities granted for a set of devices of which random access requests are responded and a transmission resource for one transmission opportunity.

In a seventh aspect, there is provided a non-transitory computer readable medium comprising program instructions for causing an apparatus to perform at least the method according to any one of the above third to fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
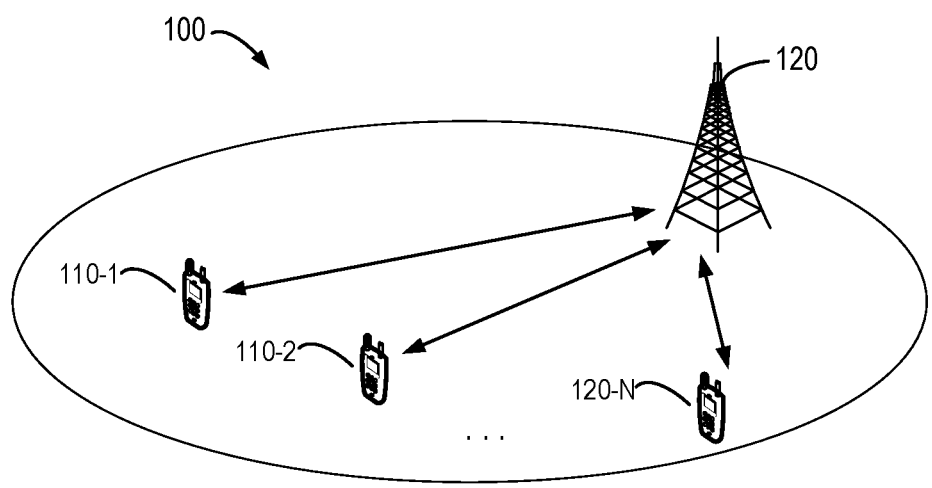
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a user equipment and a network device in the communication network may be performed according to any suitable generation communication protocols, including, but not limited to, the first generation (1 G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a user equipment accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, several mechanisms for RACH have been proposed. For example, 4-step RACH procedure and 2-step RACH procedure may be supported for in communications, for example, new radio unlicensed (NR-U) networks. The term "2-step RACH" used herein refers to the procedure which can complete contention-based RACH (CBRA) in two steps. One additional benefit of 2-step RACH is less listen-before-talk (LBT) impact with the reduced number of messages. Further, in order to alleviate the impact of LBT failures, additional opportunities for the RACH messages may be introduced.

In a conventional technology, the terminal device has to monitor a plurality of random access response (RAR) in order to obtain multiple opportunities, which may lead to extra power consumption. In other conventional technology, the terminal device may receive multiple individual RARs for the same preamble in one protocol data unit (PDU), which may cause too many overheads. Some conventional technologies require the network device to configure the multiple opportunities semi-statically, which may lack of flexibility. Further, in semi-statically configured technologies, it is required to assume worst case as the channel availability status is quite dynamic and waste too much uplink resources. In some conventional technologies, the format for the RAR may be changed to indicate multiple uplink grants within each individual RAR, which may lack of backward compatibility. Thus, a new solution for providing multiple transmission opportunities is needed.

According to embodiments of the present disclosure, the network device transmits the random access response which comprises an indication as to the number of transmission opportunities. If the random access response comprises the preamble of the terminal device, the indication as to the number of transmission opportunities is applied to the terminal device. In this way, overheads are saved and the flexibility is improved.

FIG. 1 illustrates a schematic diagram of a communication system 100 in which embodiments of the present disclosure can be implemented. The communication system 100 comprises the first devices 110 and the second device 120. For the purpose of illustrations, the first devices 110 may be referred to as the terminal device 110 and the second device 120 may be referred to as the network device 120 hereinafter. It should be noted that the first devices and the second devices are interchangeable. For example, the procedures which are described to be implemented at the terminal device may also be able to be implemented at the network device and the procedures which are described to be implemented at the network device may also be able to be implemented at the terminal device.

The link from the second device 120 to the first devices 110 may be referred to as the "down link" and the link from the first devices 110 to the second device 120 may be referred to as the "uplink link."

The communication system 100, which is a part of a communication network, comprises terminal devices 110-1, 110-2, . . . , 110-N (collectively referred to as "terminal device(s) 110" where N is an integer number). The communication system 100 comprises one or more network devices, for example, a network device 120. It should be understood that the communication system 100 may also comprise other elements which are omitted for the purpose of clarity. It is to be understood that the numbers of terminal devices and network devices shown in FIG. 1 are given for the purpose of illustration without suggesting any limitations. The terminal devices 110 and the network device 120 may communicate with each other.

It is to be understood that the number of network devices and terminal devices is only for the purpose of illustration without suggesting any limitations. The system 100 may include any suitable number of network devices and terminal devices adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
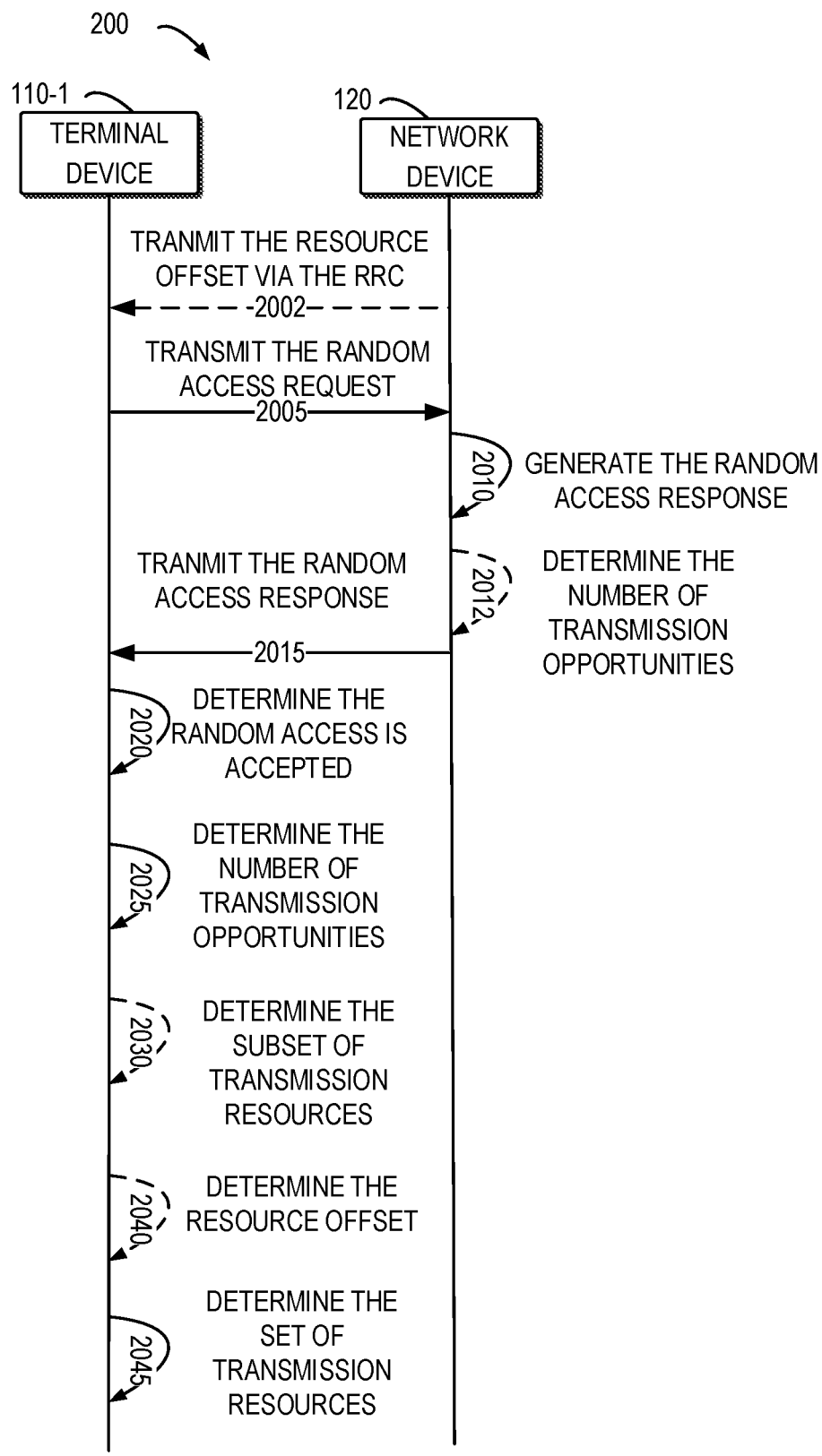
FIG. 2 illustrates a schematic diagram of interactions among devices according to embodiments of the present disclosure.

FIG. 2 illustrates a schematic diagram of interactions 200 in accordance with embodiments of the present disclosure. The interactions 200 may be implemented at any suitable devices. Only for the purpose of illustrations, the interactions 200 are described to be implemented at the terminal device 110-1 and the network device 120.

The terminal device 110-1 transmits 2005 a random access request to the network device 120. The random access request comprises a preamble of the terminal device 110-1. In some embodiments, the random access may be triggered by the network device 120. Alternatively, the random access may be triggered by higher layer, for example, reestablishment of radio resource control. In some embodiments, the network device 120 may inform the terminal device 110-1 of the index of the preamble in downlink control information.

Alternatively, the terminal device 110-1 may choose the preamble by itself. In some embodiments, the terminal device 110-1 may determine a physical random access channel (PRACH) to transmit the random access request.

The network device 120 generates 2010 the random access response to the random access request. If the random access request from the terminal device 110-1 is accepted, the random access response comprises the preamble of the terminal device 110-1. The random access response also comprises information of the transmission resource granted for the terminal device 110-1. For example, if the transmission resources are in time domain, the random access response may comprise information about one or more time slots which can be used by the terminal device 110-1 to perform uplink transmission. Alternatively, if the transmission resources are in frequency domain, the random access response may comprise information about one or more physical resource blocks which can be used by the terminal device to perform uplink transmission.

The random access response comprises an indication (also referred to as "multiple opportunities indication") as to the number of transmission opportunities for the terminal device 110-1. The random access response comprises an indication as to the number of transmission opportunities granted for a set of terminal devices which are allowed for random access. If the random access response are transmitted to several terminal devices, the multiple opportunities indication are applied to the set of terminal devices of which random access requests are responded.

In some embodiments, the network device 120 may determine 2012 the number of transmission opportunities based on the channel status between the network device 120 and the terminal device 110-1. In some embodiments, the multiple opportunities indication may indicate multiple time domain opportunities with a time domain offset from the uplink grant. Alternatively, the indication may indicate multiple frequency domain opportunities with a frequency offset to the resources (PRBs) provided in the uplink grant.

Figure 3A:
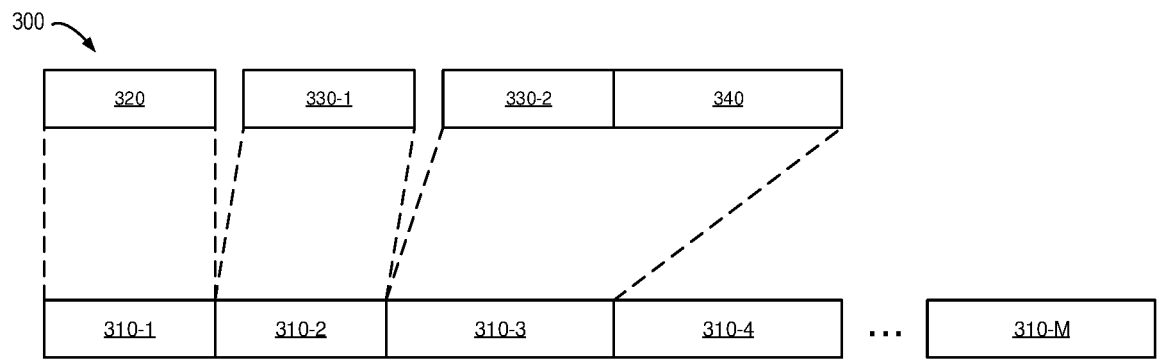
FIG. 3A-3C illustrate schematic diagrams of random access response.
Figure 3B:
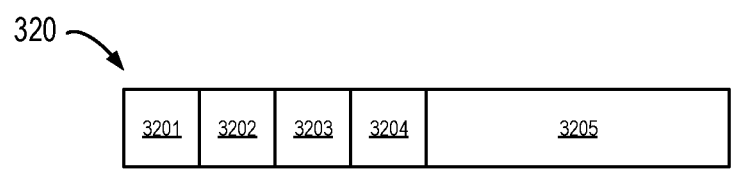
Figure 3C:
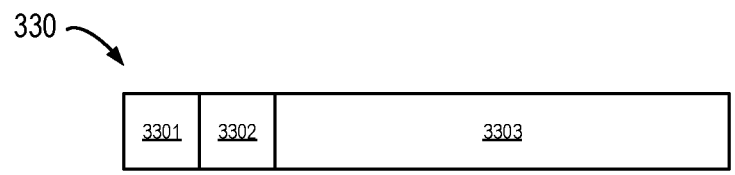

FIGS. 3A-3C illustrate schematic diagrams of the random access response in medium access control (MAC) PDU 300. The MAC PDU 300 may comprise MAC sub PDU 310-1, 310-2, 310-3, 310-4, . . . , 310-M (where M is an integer number). The MAC subPDU may comprise one of: a MAC subheader with Backoff Indicator only; a MAC subheader with random access preamble identifier (RAPID) only (i.e. acknowledgment for system information (SI) request); a MAC subheader with RAPID and MAC RAR.

As shown in FIG. 3A, the MAC sub PDU 310-1 has an E/T/R/BI subheader 320, the MAC sub PDU 310-2 has a subheader 330-1, and the MAC sub PDU 310-3 has a subheader 330-2 and a MAC RAR 340. As shown in FIG. 3B, the subheader 320 with Backoff Indicator has five header fields: E field 3201, T field 3202, R field 3203, R field 3204 and Backoff Indicator field 3205. The subheader 320 with Backoff Indicator may only be placed at the beginning of the MAC PDU 300. As shown in FIG. 3C, the subheader with RAPID 330-1 has three header fields: E field 3301, T field 3302, and RAPID field 3303. The reserved bits in the subheader 320 may be used to indicate the number of transmission opportunities. The legacy terminal devices are not impacted since the legacy terminal devices may take it as no back off.

Table 1 below shows the relationship between reserved bits and the number of transmission opportunities. It should be noted that the values and numbers shown in FIG. 1 are only examples not limitations.

TABLE 1

| Multiple Opportunities Indication | The Number of Transmission Opportunities |
| --- | --- |
| 00 | 1 |
| 01 | 2 |
| 10 | 3 |
| 11 | 4 |

In this way, the multiple opportunities indication is applicable to all the UL grants in each individual RAR and the size of each individual RAR within the RAR PDU remains unchanged. It saves overhead comparing to duplicating the individual RARs in the PDU or sending them in multiple RARs. It may also provide more flexibility comparing to semi-statically configured via RRC since the channel busy/idle status is quite dynamic.

The network device 120 transmits 2015 the random access response to the terminal device 110-1. In some embodiments, the terminal device may monitor the physical downlink control channel (PDCCH) to receive the random access response. The terminal device 110-1 determines 2020 whether the random access is responded. For example, if the preamble ID (identity) of the terminal device 110-1 is in the random access response, the terminal device 110-1 may determine that the random access is responded. If the random access response comprises the preamble of the terminal device 110-1, the terminal device 110-1 determines 2025 the number of transmission opportunities from the random access response. For example, as mentioned above, if the subheader 320 comprises the indication "10", the terminal device 110-1 may determine that there are three transmission opportunities.

The terminal device 110-1 may determine 2030 the transmission resource (also known as the "UL grant") from the random access response. For example, the terminal device 110-1 may determine the transmission resource from the MAC RAR (for example, the MAC RAR 340). The random access response may comprise several bits to assign time and/or frequency resources to the terminal device 110-1.

In some embodiments, the network device 120 may transmit 2002 the resource offset to the terminal device 110-1 via the RRC signaling before the Random Access procedure. Alternatively, the resource offset may be pre-configured to the terminal device 110-1. For example, the resource offset may be defined in the specification.

In some embodiments, the resource offset may be in frequency domain. For example, the frequency offset may be 20 MHz. Alternatively, the resource offset may be in time domain. The terminal device 110-1 may determine 2040 the resource offset from the information received via the RRC signaling. In some embodiments, the terminal device may also determine 2040 the resource offset in the pre-configured information. In some embodiments, the multiple time domain opportunities are continuous uplink grant following the UL grant indicated in the random access response without any gap/offset between the opportunities.

The terminal device 110-1 determines 2045 the set of transmission resources based at least in part on the number of transmission opportunities. The terminal device 110-1 may determine the set of transmission resources based on the number of transmission opportunities and the resource offset.

Figure 4:
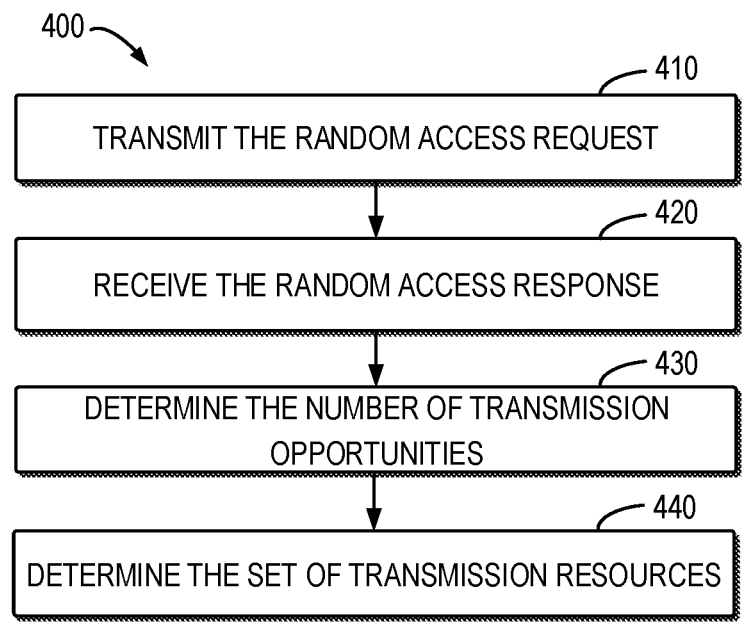
FIG. 4 illustrates a flow chart of a method implemented at a network device according to embodiments of the present disclosure.

FIG. 4 illustrates a flow chart of a method 400 in accordance with embodiments of the present disclosure. The method 400 may be implemented at any suitable devices. Only for the purpose of illustrations, the method 400 is described to be implemented at the terminal device 110-1. It should be noted that the method 400 may also be implemented at the network device 120.

At block 410, the terminal device 110-1 transmits a random access request to the network device 120. The random access request comprises a preamble of the terminal device 110-1. The random access may be triggered by the network device 120. Alternatively, the random access may be triggered by higher layer, for example, reestablishment of radio resource control. In some embodiments, the network device 120 may inform the terminal device 110-1 of the index of the preamble in downlink control information.

Alternatively, the terminal device 110-1 may choose the preamble by itself. The terminal device 110-1 may determine a physical random access channel (PRACH) to transmit the random access request.

At block 420, the terminal device 110-1 receives the random access response from the network device 120. The terminal device may monitor the physical downlink control channel (PDCCH) to receive the random access response. If the random access request from the terminal device 110-1 is responded, the random access response comprises the preamble ID of the terminal device 110-1. In some embodiments, the random access response comprises an indication as to the number of transmission opportunities granted for a set of terminal devices of which random access requests are responded. If the random access response are transmitted to several terminal devices, the multiple opportunities indication are applied to the set of terminal devices of which random access requests are responded.

At block 430, the terminal device 110-1 determines the number of transmission opportunities based on the random access response if the preamble ID of the terminal device 110-1 is in the random access response. The random access response comprises an indication as to the number of transmission opportunities for the terminal device 110-1.

In some embodiments, the indication may indicate multiple time domain opportunities with a time domain offset from the uplink grant. In some embodiments, the multiple time domain opportunities are continuous uplink grant following the UL grant indicated in the random access response. Alternatively, the indication may indicate multiple frequency domain opportunities with a frequency offset to the resources (PRBs) provided in the uplink grant. For example, as mentioned above, if the subheader comprises the indication "10", the terminal device 110-1 may determine that there are three transmission opportunities.

At block 440, the terminal device 110-1 determines the set of transmission resources based at least in part on the number of transmission opportunities. The terminal device 110-1 may determine the set of transmission resources based on, the transmission resource, the number of transmission opportunities and the resource offset. In some embodiments, the terminal device 110-1 may determine the transmission resource from the random access response. For example, the terminal device 110-1 may determine the transmission resource from the MAC RAR. The random access response may comprise several bits to assign time and/or frequency resources to the terminal device 110-1.

In some embodiments, the terminal device 110-1 may receive the resource offset from the network device 120 via the RRC signaling. Alternatively, the resource offset may be pre-configured to the terminal device 110-1. For example, the resource offset may be defined in the specification. In some embodiments, the resource offset may be in frequency domain. For example, the frequency offset may be 20 MHz. Alternatively, the resource offset may be in time domain. The terminal device 110-1 may determine 2040 the resource offset from the information received via the RRC signaling. In some embodiments, the terminal device may also determine 2040 the resource offset in the pre-configured information.

Figure 5:
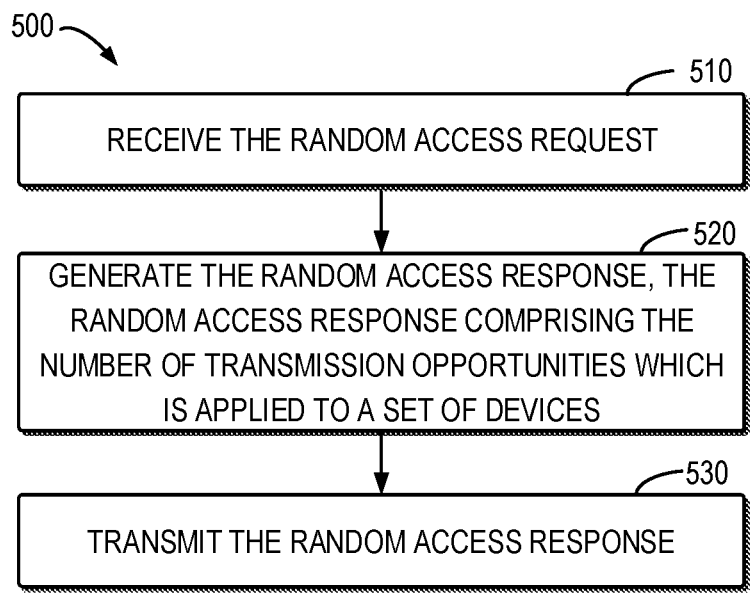
FIG. 5 illustrates a flow chart of a method implemented at a terminal device according to embodiments of the present disclosure.

FIG. 5 illustrates a flow chart of a 500 in accordance with embodiments of the present disclosure. The method 400 may be implemented at any suitable devices. Only for the purpose of illustrations, the method 500 is described to be implemented at the network device 120. It should be noted that the method 500 may also be implemented at the terminal device 110-1.

At block 510, the network device 120 receives a random access request from the terminal device 110-1. The random access request comprises a preamble of the terminal device 110-1. In some embodiments, the random access may be triggered by the network device 120. Alternatively, the random access may be triggered by higher layer, for example, reestablishment of radio resource control. In some embodiments, the network device 120 may inform the terminal device 110-1 of the index of the preamble in downlink control information. The network device 120 may receive multiple random access requests from multiple terminal devices.

At block 520, the network device 120 generates 2010 the random access response to the random access request. If the random access request from the terminal device 110-1 is responded, the random access response comprises the preamble ID of the terminal device 110-1.

The random access response also comprises information of the transmission resource granted for the terminal device 110-1. For example, if the transmission resources are in time domain, the random access response may comprise information about one or more time slots which can be used by the terminal device 110-1 to perform uplink transmission. Alternatively, if the transmission resources are in frequency domain, the random access response may comprise information about one or more physical resource blocks which can be used by the terminal device to perform uplink transmission.

The random access response comprises an indication as to the number of transmission opportunities for the terminal device 110-1. The random access response comprises an indication as to the number of transmission opportunities granted for a set of terminal devices of which random access requests are responded. If the random access response are transmitted to several terminal devices, the multiple opportunities indication are applied to the set of terminal devices of which random access requests are responded.

In some embodiments, the network device 120 may determine the number of transmission opportunities based on the channel status between the network device 120 and the terminal device 110-1. In some embodiments, the indication may indicate multiple time domain opportunities with a time domain offset from the uplink grant. Alternatively, the indication may indicate multiple frequency domain opportunities with a frequency offset to the resources (PRBs) provided in the uplink grant.

At block 530, the network device 120 transmits the random access response. For example, the network device 120 may transmit the random access response on the PDCCH. In some embodiments, the network device 120 may transmit 2035 the resource offset to the terminal device 110-1 via the RRC signaling. In some embodiments, the resource offset may be in frequency domain. For example, the frequency offset may be 20 MHz. Alternatively, the resource offset may be in time domain.

In some embodiments, an apparatus for performing the method 400 (for example, the terminal device 110-1) may comprise respective means for performing the corresponding steps in the method 400. These means may be implemented in any suitable manners. For example, it can be implemented by circuitry or software modules.

In some embodiments, the apparatus comprises: means for transmitting a random access request from a first device to a second device, the random access request comprising a preamble of the first device; means for receiving a random access response to the random access request from the second device, the random access response comprising an indication as to the number of transmission opportunities granted for a set of devices of which random access requests are responded; means for determining the number of transmission opportunities granted for the first device based on the indication in response to determining that the random access response comprises the preamble of the first device; and means for determining a set of transmission resources for the first device based at least in part on the number of the transmission opportunities.

In some embodiments, the means for determining the set of transmission resources for the first device comprises: means for determining a transmission resource for one transmission opportunity based on the random access response; means for receiving information from the second device via radio resource signaling, the information comprising a resource offset; and means for determining the set of transmission resources for the transmission opportunities based on the transmission resource for one transmission opportunity, the number of the transmission opportunities and the resource offset.

In some embodiments, the means for determining the set of transmission resources for the first device comprises: means for determining a transmission resource for one transmission opportunity based on the random access response; means for obtaining a resource offset which is preconfigured to the first device; and means for determining the set of transmission resources for the transmission opportunities based on the transmission resource for one transmission opportunity, the number of the transmission opportunities and the resource offset.

In some embodiments, the set of transmission resources and the resource offset are in time domain.

In some embodiments, the set of transmission resources and the resource offset are in frequency domain.

In some embodiments, the first device is a terminal device and the second device is a network device In some embodiments, an apparatus for performing the method 500 (for example, the network device 120) may comprise respective means for performing the corresponding steps in the method 500. These means may be implemented in any suitable manners. For example, it can be implemented by circuitry or software modules.

In some embodiments, the apparatus comprises: means for receiving, from a first device and at a second device, a random access request comprising a preamble of the first device; means for in response to the random access request being responded, generating a random access response to the random access request, the random access response comprising the preamble of the first device; and means for transmitting the random access response to the first device, the random access response comprising: an indication as to the number of transmission opportunities granted for a set of devices of which random access requests are responded and a transmission resource for one transmission opportunity.

In some embodiments, the apparatus further comprises: means for transmitting information to the first device via radio resource signaling, the information comprising a resource offset for determining a set of transmission resources for the transmission opportunities.

In some embodiments, the set of transmission resources and the resource offset are in time domain.

In some embodiments, the set of transmission resources and the resource offset are in frequency domain.

In some embodiments, the first device is a terminal device and the second device is a network device.

In some embodiments, the apparatus further comprises: means for determining the number of the transmission opportunities granted for the first device based on a channel status between the first and second devices.

Figure 6:
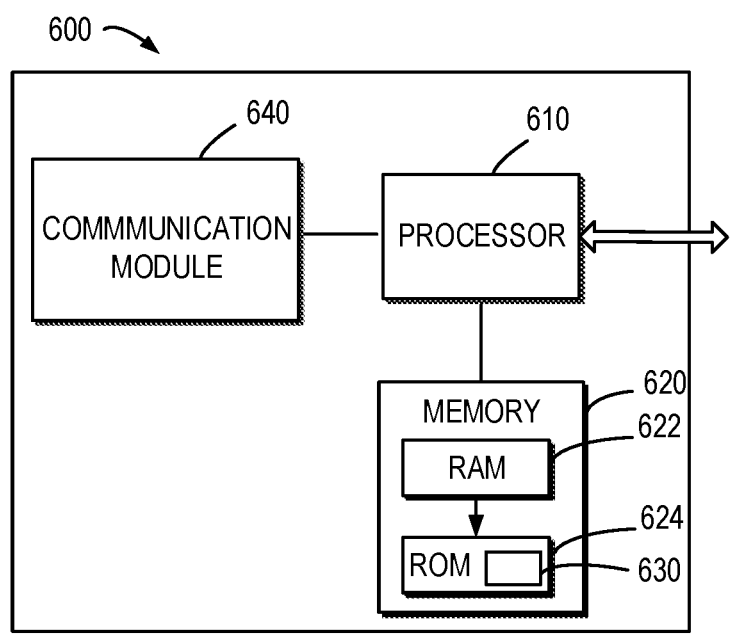
FIG. 6 illustrates a schematic diagram of a device according to embodiments of the present disclosure.

FIG. 6 is a simplified block diagram of a device 600 that is suitable for implementing embodiments of the present disclosure. The device 600 may be provided to implement the communication device, for example the network device 120 or the terminal devices 110 as shown in FIG. 1. As shown, the device 600 includes one or more processors 610, one or more memories 620 coupled to the processor 610, and one or more communication module (for example, transmitters and/or receivers (TX/RX)) 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
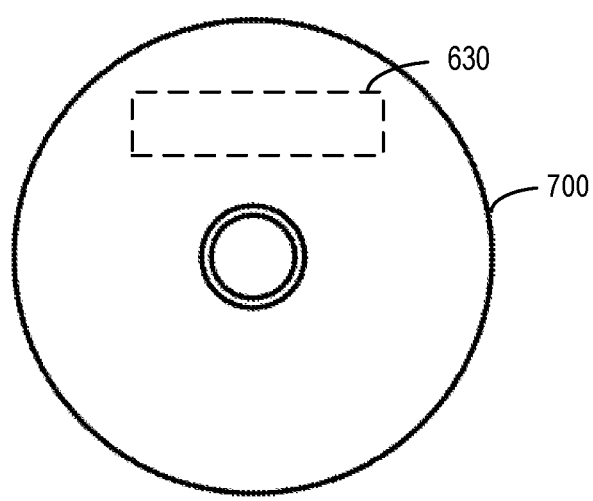
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device comprising:
   at least one processor; and
   at least one memory storing instructions, that when executed by the at least one processor, cause the device to:
   transmit a random access request from the device to a further device, the random access request comprising a preamble of the device;
   receive a random access response to the random access request from the further device, the random access response comprising an indication as to the number of transmission opportunities granted for a set of devices of which random access requests are responded,
   wherein the indication is indicating the number of transmission opportunities with a time domain offset from an uplink grant, and
   wherein one of the number of transmission opportunities are of a continuous uplink grant following the uplink grant, or the number of transmission opportunities with a frequency offset to resources physical resource blocks is provided in the uplink grant;
   in response to determining that the random access response comprises a preamble identification of the device, determine the number of transmission opportunities granted for the device based on the indication; and determine a set of transmission resources for the device based at least in part on the number of the transmission opportunities.

2. The device of claim 1, wherein the at least one memory is storing instructions, that when executed by the at least one processor, cause the device to determine the set of transmission resources for the device comprising:

determining a transmission resource for one transmission opportunity based on the random access response;

receiving information from the further device via radio resource signaling, the information comprising a resource offset; and determining the set of transmission resources for the transmission opportunities based on the transmission resource for one transmission opportunity, the number of the transmission opportunities and the resource offset.

3. The device of claim 1, wherein the at least one memory is storing instructions, that when executed by the at least one processor, cause the device to:

determine the set of transmission resources for the device comprising:

determining a transmission resource for one transmission opportunity based on the random access response;

obtaining a resource offset which is preconfigured to the device; and determining the set of transmission resources for the transmission opportunities based on the transmission resource for one transmission opportunity, the number of the transmission opportunities and the resource offset.

4. The device of claim 2, wherein the set of transmission resources and the resource offset are in time domain.

5. The device of claim 2, wherein the set of transmission resources and the resource offset are in frequency domain.

6. A device comprising:

at least one processor; and at least one memory including computer program codes;

the at least one memory is storing instructions, that when executed by the at least one processor, cause the device to:

receive, from a further device, a random access request comprising a preamble of the further device;

in response to the random access request being responded, generate a random access response to the random access request, the random access response comprising the preamble of the further device; and transmit the random access response to the further device, the random access response comprising:

an indication as to the number of transmission opportunities granted for a set of devices of which random access requests are responded and a transmission resource for one transmission opportunity, wherein the indication is indicating the number of transmission opportunities with a time domain offset from an uplink grant, and wherein one of the number of transmission opportunities are of a continuous uplink grant following the uplink grant, or the number of transmission opportunities with a frequency offset to resources physical resource blocks is provided in the uplink grant.

7. The device of claim 6, wherein the at least one memory is storing instructions, that when executed by the at least one processor, cause the device to:

transmit information to the further device via radio resource signaling, the information comprising a resource offset for determining a set of transmission resources for the transmission opportunities.

8. The device of claim 7, wherein the set of transmission resources and the resource offset are in time domain.

9. The device of claim 7, wherein the set of transmission resources and the resource offset are in frequency domain.

10. The device of claim 6, wherein the at least one memory is storing instructions, that when executed by the at least one processor, cause the device to:

determine the number of the transmission opportunities granted for the further device based on a channel status between the device and the further device.

11. A method comprising:

transmitting a random access request from a first device to a second device, the random access request comprising a preamble of the first device;

receiving a random access response to the random access request from the second device, the random access response comprising an indication as to a number of transmission opportunities, based at least on a preamble identification of the device in the random access response, granted for a set of devices of which random access requests are responded, wherein the indication is indicating the number of transmission opportunities with a time domain offset from an uplink grant, and wherein one of the number of transmission opportunities are of a continuous uplink grant following the uplink grant, or the number of transmission opportunities with a frequency offset to resources physical resource blocks is provided in the uplink grant;

in response to determining that the random access response comprises a preamble identification of the first device, determining the number of transmission opportunities granted for the first device based on the indication; and determining a set of transmission resources for the first device based at least in part on the number of the transmission opportunities.

12. The method of claim 11, wherein determining the set of transmission resources for the first device comprises:

determining a transmission resource for one transmission opportunity based on the random access response;

receiving information from the second device via radio resource signaling, the information comprising a resource offset; and determining the set of transmission resources for the transmission opportunities based on the transmission resource for one transmission opportunity, the number of the transmission opportunities and the resource offset.

13. The method of claim 11, wherein determining the set of transmission resources for the first device comprises:

determining a transmission resource for one transmission opportunity based on the random access response;

obtaining a resource offset which is preconfigured to the first device; and determining the set of transmission resources for the transmission opportunities based on the transmission resource for one transmission opportunity, the number of the transmission opportunities and the resource offset.

14. The method of claim 12, wherein the set of transmission resources and the resource offset are in time domain.

15. The method of claim 12, wherein the set of transmission resources and the resource offset are in frequency domain.

16. A method comprising:
receiving, from a first device and at a second device, a random access request comprising a preamble of the first device;
in response to the random access request being responded, generating a random access response to the random access request, the random access response comprising the preamble of the first device; and
transmitting the random access response to the first device, the random access response comprising an indication as to a number of transmission opportunities granted for a set of devices of which random access requests are responded and a transmission resource for one transmission opportunity,
wherein the indication is indicating the number of transmission opportunities with a time domain offset from an uplink grant, and
wherein one of the number of transmission opportunities are of a continuous uplink grant following the uplink grant, or the number of transmission opportunities with a frequency offset to resources physical resource blocks is provided in the uplink grant.

17. The method of claim 16, further comprising:
transmitting information to the first device via radio resource signaling, the information comprising a resource offset for determining a set of transmission resources for the transmission opportunities.

18. The method of claim 17, wherein the set of transmission resources and the resource offset are in time domain.

19. The method of claim 17, wherein the set of transmission resources and the resource offset are in frequency domain.

20. The method of claim 16, further comprising:
determining the number of the transmission opportunities granted for the first device based on a channel status between the first and second devices.

21. A non-transitory computer readable medium storing instructions thereon, the instructions, when executed by at least one processor of a machine, causing the machine to perform the method according to claim 11.

22. A non-transitory computer readable medium storing instructions thereon, the instructions, when executed by at least one processor of a machine, causing the machine to perform the method according to claim 16.

* * * * *